United States Patent
Partington

(10) Patent No.: US 7,541,113 B2
(45) Date of Patent: Jun. 2, 2009

(54) PORE FREE ELECTRODE FORMED OF CONDUCTIVE TITANIUM SUBOXIDE PARTICLES AND HARDENED THERMOSET RESIN

(75) Inventor: Thomas John Partington, Leeds (GB)

(73) Assignee: Atraverda Limited, Abertillery (GB)

( * ) Notice: Subject to any disclaimer, the term of this patent is extended or adjusted under 35 U.S.C. 154(b) by 600 days.

(21) Appl. No.: 10/466,861

(22) PCT Filed: Jan. 21, 2002

(86) PCT No.: PCT/GB02/00230

§ 371 (c)(1),
(2), (4) Date: Sep. 5, 2003

(87) PCT Pub. No.: WO02/058174

PCT Pub. Date: Jul. 25, 2002

(65) Prior Publication Data

US 2004/0072074 A1    Apr. 15, 2004

(30) Foreign Application Priority Data

Jan. 19, 2001 (GB) ................. 0101401.8
Nov. 29, 2001 (GB) ................. 0128607.9

(51) Int. Cl.
*H01M 4/56* (2006.01)
(52) U.S. Cl. .................... 429/231.5; 429/228
(58) Field of Classification Search ............. 429/228, 429/231.5
See application file for complete search history.

(56) References Cited

U.S. PATENT DOCUMENTS

| 4,197,178 | A | | 4/1980 | Pellegri et al. |
| 4,339,322 | A | | 7/1982 | Balko et al. |
| 4,510,219 | A | | 4/1985 | Rowlette |
| 4,830,938 | A | | 5/1989 | McCullough et al. |
| 4,938,942 | A | | 7/1990 | Gorman et al. |
| 5,017,446 | A | | 5/1991 | Reichman et al. |
| 5,106,709 | A | * | 4/1992 | Tekkanat et al. ............ 429/210 |
| 5,173,215 | A | * | 12/1992 | Clarke ........................ 423/608 |
| 5,281,496 | A | * | 1/1994 | Clarke ..................... 429/218.1 |
| 5,589,053 | A | | 12/1996 | Moran et al. |
| 5,593,797 | A | | 1/1997 | Brecht |
| 5,733,489 | A | * | 3/1998 | Hill ............................. 264/125 |
| 5,766,789 | A | * | 6/1998 | James et al. .................. 429/44 |
| 6,248,467 | B1 | * | 6/2001 | Wilson et al. ................. 429/39 |
| 6,306,543 | B1 | * | 10/2001 | Vinson .................... 429/231.5 |

FOREIGN PATENT DOCUMENTS

EP         443229          *  2/1990
WO      WO 00/25372           5/2000

* cited by examiner

*Primary Examiner*—Mark Ruthkosky
(74) *Attorney, Agent, or Firm*—Caesar, Rivise, Bernstein, Cohen & Pokotilow, Ltd.

(57) ABSTRACT

An electrode for a bipolar cell or battery comprises a plate like body made of hardened resin containing particles of titanium suboxide or other electrically conductive particulate arranged to form electrical paths. A method of testing the body for porosity is also disclosed.

48 Claims, 1 Drawing Sheet

PORE FREE ELECTRODE FORMED OF CONDUCTIVE TITANIUM SUBOXIDE PARTICLES AND HARDENED THERMOSET RESIN

The invention relates to electrodes for use in a battery, typically a bipolar lead-acid battery.

It is known to make bipolar plate electrodes for this purpose from lead and lead alloys. Ideally the electrodes are very thin to reduce the size and weight of the battery but thin sheets of lead metal and lead alloys are difficult to seal around the edges. A reliable seal is required in bipolar batteries to prevent conductive paths of electrolyte being formed from one side of the bipolar plate to the other, which would cause self discharge of the battery. The plate electrodes are not entirely resistant to galvanic corrosion which generally results in through-plate porosity in the form of pinholes (and the electrodes are heavy if manufactured in greater thickness to overcome this problem). Proposals to reduce the effective weight of the lead include the use of porous ceramics with lead infiltrated into the pores (which need to be of fairly thick section to be mechanically robust, and are thereby still rather heavy); and the use of glass fibres and flakes coated with lead, lead alloy, or doped tin oxide, or lead oxides as conductive particulate in a thermoplastic resin matrix but such electrodes are complex and expensive to produce. Carbon based materials have been tried, but most forms are susceptible to electrochemical oxidation.

Plates made exclusively of the Magneli phase suboxides of titanium (of the general formula $Ti_nO_{2n-1}$ (where n is an integer greater than 4 or greater) satisfy many of the criteria above. However, they are expensive to make, are brittle, and do not easily accept surface features, for example to accept and retain the battery paste coating.

This invention is based on the realisation that if the plates can be made from the Magneli titanium suboxide material in particulate form in a suitable polymeric matrix, most, if not all, of these weaknesses can be overcome.

Figure 1:
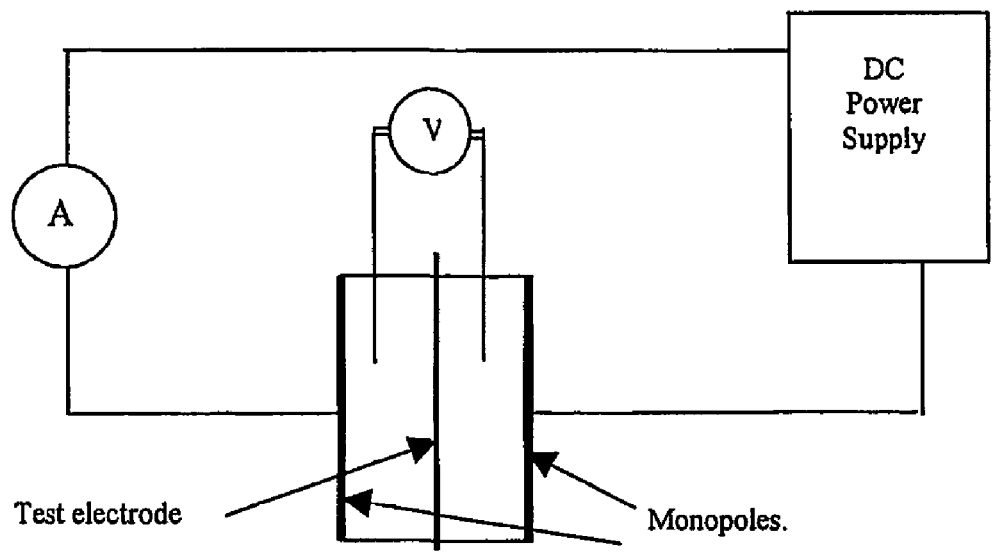
FIG. 1 shows a DC power supply attached to a test electrode with two monopoles.

According to the invention in one aspect there is provided an electrode comprising a shaped substantially pore-free body of hardened resin, the body having electrical paths defined by contacting particles of titanium suboxide of the formula $Ti_nO_{2n-1}$ where n is 4 or greater.

The particulate titanium suboxide is preferably selected to provide a high level of conductivity; $Ti_4O_7$ and $Ti_5O_9$ are preferred. Some suboxides have low conductivity and poor corrosion resistance and preferably are avoided; an example is $Ti_3O_5$. Although the particles can be provided as a mixture of the Magneli phases it is important that the presence of lower oxides such as TiO, $Ti_2O_3$, $Ti_3O_5$ is minimised and preferably entirely avoided.

It is a preferred feature of the invention that the particle size distribution is selected so that the particles will contact each other intimately to create electrical paths and provide conductivity. Preferably the particle size distribution is relatively narrow since this gives good electrical connectivity. Preferably the particles have a particle size distribution with a standard deviation of less than about 50% of the mean particle size. Polymodal mixtures can also be used but care must be taken to ensure that the populations of smaller particles do not reduce the electrical connectivity of the populations of larger particles.

We have found that specific particle sizes and particle size distributions are required for making electrodes of a specific thickness but a mean particle size (by volume) of around 100 to 150 micrometers is suitable for an electrode of 1 to 2 mm thickness. For making thinner electrodes which may be preferred, smaller particles are required of the plate is to be pore free. However, if the average particle size is small it is more difficult to achieve a suitably narrow particle size distribution to give a good conductivity.

The powder is manufactured by methods such as are taught in U.S. Pat. No. 5,173,215. The manufacturing conditions are adjusted to ensure that the powder has a high proportion of the $Ti_4O_7$ and $Ti_5O_9$ crystallography (to produce high conductivity) and effectively none of the non-Magneli $Ti_3O_5$ material (which causes poor corrosion resistance and low conductivity). The precursor $TiO_2$ powder is chosen or treated to produce a Magneli phase suboxide powder with particle size distribution required for good conductivity.

The resin may be selected from a wide variety of materials. Preferred are thermoset resins. One suitable resin to manufacture a corrosion resistant plate is an uncured epoxy such as Araldite® PY307-1, in conjunction with HY3203® hardener, both materials being available from Vantico Ltd. This has been found to be particularly resistant to anodic corrosion and to make a pore free plate, although other resin systems will produce satisfactory products. Thermoset resins are particularly suitable for the manufacturing of good conductivity plates since they are handled in a hot press, which also presses the particles together for intimate electronic contact, and they also shrink somewhat on curing, further pushing the particles together. Other candidate thermoset resins include epoxyphenols, novolac resins, bisphenol A based epoxy resins, bisphenol F epoxy resins; polyesters (saturated, unsaturated, isophthalic, orthophthalic, neopentylglycol modified, modified vinylester; vinylester urethane and the like. Some grades of these polymers have been found to exhibit a relatively excessive amount of shrinkage on curing coupled with a relatively poor adhesion to the particles which allows interconnecting voids to appear around the surfaces of the particles which makes them unsuitable for producing substantially pore-free plates. However, low shrink and other additives may be included in commercial grades of these resins, provided that they do not have a detrimental effect on the chemical stability of the resin in the acid electrolyte. Some polymers have been shown to be unstable in the polarised presence of an acid electrolyte. Some commercial resins have a mould release agent preblended in the mixture and these should be avoided in this application since they can adversely affect the adhesion of the active battery materials and potentially affect the corrosion stability of the plate and also the surface chemistry (surface tension etc.) of the battery acid electrolyte. The chosen resin will preferably be one which is resistant to the electrolyte acid, especially where the electrode is for bipolar batteries.

U.S. Pat. No. 5,017,446, discloses the inclusion of a wide range of conductive fillers in a thermoplastics resin. We have found that the high volume fraction of particles disclosed in U.S. Pat. No. 5,017,446 means that the finished electrode is very porous and unsuitable for use as a bipolar electrode unless great care is taken in ensuring that the particle size distribution of the particles is such as to engender a very close packing density, such as a bimodal or trimodal distribution. In addition, the matrix of 60% volume solids in a thermoplastic, which this source uses as an example has very poor flow properties even at the high melt temperatures (370° C.) cited, and would be unsuitable for injection moulding—which is the preferred mass production technique for thermoplastic materials. In order to improve both the porosity and the flow characteristics of the melt, it is necessary to significantly reduce the fraction of solid particles in the mixture to less than about 35% vol. It is clear from Table III of U.S. Pat. No. 5,017,446 that the resulting material would have a resistivity which would be unsuitable for use in a bipolar lead-acid battery where the threshold value of suitable resistivity is generally accepted to be lower than 1 Ohm.cm. In example 6, U.S. Pat. No. 5,017,446 indicates that a resistivity of 9.2 Ohm.cm was achieved which is unsuitable for use as a bipolar electrode in a lead-acid battery. The present invention is of a material which has suitable resistivity and porosity, and can be made without the need for very careful particle size management and allows a well known industrial process to manufacture.

The conductivity of the titanium suboxide particles may be improved by contact with a gas such as helium or hydrogen for a period, say up to 24 hours before being incorporated in the resin composition in manufacture of the electrode.

The relative proportions of resin and suboxide powder and the particle size distribution of the suboxide powder will affect the properties of the electrode. For example an electrode will tend to have low conductivity if:

- too high a volume proportion of resin is used; and/or
- the plate or other body shape is pressed in manufacture with too little or with uneven force; and/or
- the particle size distribution leads to low packing density; and/or
- the average particle size is too small; and/or
- the resin shrinks insufficiently on curing; and/or
- any excess resin is not ejected from the mould as flash due to either the resin curing too quickly, the viscosity of the resin being too high (either intrinsically or by virtue of the mould temperature being too low), or by the mould clearances being too small.

The electrode will tend to have unacceptable through porosity if:

- too low a volume proportion of resin is used; and/or
- the particle size distribution provides a low packing density such that there is more volume of inter-particle voids which needs to be filled with resin and so the effective volume proportion of resin becomes low and/or
- the average particle size is too large; and/or
- the resin shrinks excessively in manufacture of the electrode and by virtue of poor adhesion to the particles forms cavities adjacent to and around the particles on curing; and/or
- the resin cures too slowly, is of low viscosity (either intrinsically or by virtue of the mould temperature) or the mould clearances are too large that significant amounts of resin are lost from the mould.

When manufacturing the body it is preferred to have a slight excess of a thermoset resin. In press moulding the conducting particles are pressed together to form low resistance conductive paths. Any excess resin is ejected from the mould as "flash" before the final cure of the material, which occurs in the press, under pressure, thus locking in the electrical connectivity.

Particles with high (rods, fibres) or low (flakes) aspect ratio of the titanium suboxide can also be present to increase connectivity between the electrically conductive suboxide particles in the electrode. High aspect particles are especially favoured because they provide longer unbroken electrical paths, so increasing conductivity.

A preferred electrode of the invention is a plate which has the following combination of features:

- is electronically conductive, i.e. an overall electrical conductivity greater than 0.5 $S.cm^{-1}$ more specifically has an orthogonal conductivity of at least about 1 $S.cm^{-1}$ which is relatively uniform across the face of the plate;
- has essentially no through porosity (which would allow ionic species to travel through the pores causing self discharge of the battery) as demonstrated by a leakage current of less than 1 $A/m^2$;
- is resistant to chemical attack by the materials in a lead-acid battery (this is primarily the acid, but also the oxidant $PbO_2$ and the reductant Pb metal);
- is resistant to galvanic corrosion (especially at the oxidation potential which occurs during recharge of the positive side of the bipolar plate);
- provides an intimate and adherent surface to the active chemicals in the battery (such as $PbO_2$, $PbSO_4$, Pb, tri-basic lead sulphate, tetra-basic lead sulphate);
- is mechanically robust in thin sections. Whilst the cured resin particulate electrode is generally sufficiently robust, the presence of a moulded-in grid on the surface of an otherwise flat plate increases the stiffness of the thin plate;
- does not catalyse the production of oxygen or hydrogen at the potentials which occur during the recharge of the battery;
- provides a surface to which adhesives and sealants and/or mechanical seals can be applied;
- ideally has some surface features, (such as a triangular, square, hexagonal or other tessellated pattern grid) which will allow the active paste material to be easily and uniformly spread onto the cells thus formed, and to restrict the movement of the paste during the charge and discharge cycling of the battery, and
- ideally is of low weight.

In another aspect the invention provides a method of making an electrode, the method comprising mixing an unhardened resin, a hardener therefor, and the particles of the Magneli titanium suboxide and pouring the mix into a mould therefor to form the shaped body.

In one preferred method the resin and hardener are heated, the particles of titanium suboxide are added to form a dough, which is then added to a preheated mould. In another preferred method the resin components and the suboxide particles are first formed into a sheet moulding compound which can be placed uniformly in the mould because it can be handled easily.

The method preferably includes the step of placing the mould in a heated press and applying pressure. The pressure may be about 2000 Pa and the temperature at least 35° C., preferably at least 70° C. In one embodiment the method includes the further step of removing the shaped article from the mould and cleaning the surfaces by processes such as grit blasting, applying corona discharge and plasmas, and other surface cleaning techniques.

The method further includes the step of applying a battery paste to the electrode. Different amounts of paste may be applied to different areas of the electrode.

Preferably the method includes the step of first applying a thin layer of metal to the electrode before the paste is applied. In one preferred technique the method includes applying the metal layer by electroplating and adding dispersoids to the plating solution.

In another preferred feature the method includes the step of pressing a thin foil, say up to about 200 micron thick, of metal on to the surface of the electrode whilst in the moulding press and the resin is curing. Other methods include plasma or flame spraying, sputtering, chemical Vapour deposition and the like.

Low viscosity resins are preferred to wet the external surface of the particles which will enhance low porosity say less than about 50 Pa.s at 20° C. These resins will also tend to infiltrate into the microscopic surface features of the particles to improve mechanical strength. The viscosity may be lowered by pre-heating or by selection of suitable resins. However extremely low viscosity resins should be avoided for the reasons stated above.

Coupling agents such as silanes to contact the surface of the particles may be used to improve the adhesion and wetting of the resin to the suboxide particles to enhance low porosity and high mechanical strength. The coupling and/or wetting agents (such as silanes and other surfactants) can be advantageously used on plates which do not have the metallic layer imposed. The pasting of the plates is carried out in the usual way, with conventional leady oxide paste or other lead containing pastes. The existence of the impressed surface features means that a controlled volume of paste is applied to the grid area of the plates; pasting with thicker or thinner layers can be managed by having the grid higher or lower. It is also possible, by adjusting the shape of the mould to have some areas with thick paste and other with thin paste in order to optimise the discharge characteristics of the battery. The paste on the electrode can be cured in the usual way.

In another aspect the invention provides a battery including an electrode as defined herein or when made by a method as defined herein.

Preferably the battery comprises a plurality of electrodes and an acid electrolyte.

With pasted and cured plates, a battery is assembled using a number of bipolar plates, appropriately oriented, and a single positive monopole at one end and a single negative monopole at the other. Absorptive glass mats can be advantageously inserted between each plate. Sealing of the plates is achieved in the laboratory by the use of gaskets of appropriate thickness and made of say butyl or silicone rubber sheet. The entire assembly is held together by metal straps and bolts of suitable length. In a commercial battery, in a preferred feature of the invention, the plates are sealed into a pre-moulded plastic container, with slots for each plate. A certain amount of compression of the glass mat and of the paste can be engendered by correct dimensioning of the container. Such compression has been found to aid the adhesion of the paste to the bipolar electrode substrate. Low concentration sulphuric acid can be added followed by a lid having grooves which will seal onto the edges of each plate, placed on the top. The lid can advantageously also contain a suitable gas pressure regulating system.

The battery is then electrically formed in the usual way. As the formation takes place, then the acid increases in strength, by the conversion of the sulphate-containing paste to $PbO_2$ on the positive plate and Pb metal on the negative. The initial strength of the sulphuric acid should be chosen to ensure that the final strength of the acid is in the range 30-40% by mass of sulphuric acid, or even higher.

Phosphoric acid can also be advantageously added in part or total replacement of the more usual sulphuric acid.

Batteries made by this method have high power and energy density ($W/m^3$, $Wh/m^3$), high specific power and energy (W/kg, Wh/kg.) They have high cycle life, even in deep discharge conditions, and can be manufactured cheaply with conventional technology.

In a bipolar battery it is important for efficient discharge at high rates that the monopolar or end electrodes have excellent planar conductivity. By this invention monopolar plates can be made by substituting for one side of the mould a flat plate and then placing a metallic grid or mesh in the mould before the uncured resin and the suboxide materials are placed in the mould. When the mould is closed and the resin is cured, the metal grid or mesh will be pressed into one side of the formed electrode, giving it excellent planar conductivity for the purposes of a monopolar or end plate. Of course, the metal grid or mesh should not be exposed to the electrolyte otherwise it will corrode. Preferably metal studs are electrically attached to the metal grid or mesh to provide terminal connections. Lead or lead alloy foils can also be advantageously applied to the reverse face of the electrode in the mould instead of the metal grid or mesh to provide good planar conductivity for the monopolar or end electrodes.

Metal plates, grids or meshes may be advantageously incorporated into the bipolar plates in order to increase the planar conductivity and ensure good current distribution over the full area of the electrodes. Cooling channels can be introduced into the bipolar plates in like manner.

In another aspect the invention includes a method of testing to confirm the absence of invisible micropores which lead to though porosity in an electrode before pasting, comprising placing the electrode in a simulated battery and measuring the flow of current over time.

A satisfactory electrode will have a current leakage of less than 1 $A/m^2$ over 28 days when tested in the apparatus of Example 2.

In order that the invention may be well understood it will now be described with references to the following Examples.

EXAMPLE 1

24 g of ARALDITE PY307+1 resin and 8.8 g of the HY3203 hardener were weighed out into separate containers and pre-warmed in an oven at 50° C. for a minimum of 7 minutes. These materials are available from Vantico Ltd. They were then thoroughly mixed together and 65 g of the Magneli suboxide powder as below is added and mixed in thoroughly to form a dough. The phase analysis of the Magneli suboxide powder was measured by X-ray diffraction as:

| | |
|---|---|
| $Ti_4O_7$ | 26% |
| $Ti_5O_9$ | 69% |
| $Ti_6O11$ | 5% |

The particle size distribution was measured on a Malvern Mastersizer to be:
100 vol % below 300 micrometers
95 vol % below 150 micrometers
90 vol % below 125 micrometers
50 vol % below 85 micrometers
10 vol % below 40 micrometers The dough was evenly spread into a mould that has been pre-warmed to 75° C. Even spreading is important to achieve uniform conductivity across the face of the plate. The laboratory mould is of a "window frame" type and consists of two platens and a frame. The mould cavity has an area of 149×109 mm (0.01624 $m^2$) and will therefore produce plates of this size. The volume of dough was sufficient to produce a plate about 1.5 mm thick at the base of the grid cells. Two locating pins at diagonal corners are used to locate the various parts of the mould. Spacer levers are available to re-open the mould to eject the manufactured part after moulding is completed. Both platens can be fitted with plates which have machined slots 1 mm deep in the face, so that the moulded part can have a raised grid on either surface. In the example, this grid covers the central 136×96 mm. The grid of the laboratory plates did not extend to the perimeter of the plate to provide a flange for sealing. The dimensions of the grid can be changed by altering the shape of the mould, and thus different volumes of active paste material will be applied to the plates in a controlled manner.

The mould can be advantageously treated with an appropriate mould release agent such as Frekote 770NC®. The mould was closed and placed in a heated press at 75° C. The mould was initially pressed at 70 kN (1137 Pa) for 5 seconds and then 100 kN (1625 Pa) for 25 minutes. The mould is opened and the resulting plate is extracted. Any flashing is removed with a metal spatula.

The conductivity of the plate was then tested and was found to be in the range 1-2 $S.cm^{-1}$. In this example, the density of the final plate was around 2.2 g/cc. Higher pressing pressures produce higher levels of conductivity. Thus the preferred range of densities for the final product is in the range of 1.8 to 2.4 g/cc or above The surface of the plate was cleaned by grit blasting, in a blast chamber such as a Gyson Formula F1200®. The blast gun was supplied with air at a pressure of 0.8 MPa. Alumina was used for the blast medium, although other blast conditions and other cleaning methods will undoubtedly produce satisfactory results. The blasting was carried out manually until the entire surface was uniformly matt grey in colour. Tests with surface impedance scanning techniques have shown that this blasting in this fashion produces a plate with very uniform surface impedance. The surface of the plate may also be further modified by techniques such as corona discharge or by the application of plasmas.

The plates were pasted with active material and assembled into batteries as below. They satisfy all the criteria above. Better results were obtained if a thin metallic layer is first applied to the grid area of the plates. This layer can be of pure lead, or of lead alloys (with, for instance, antimony, barium, bismuth, calcium, silver, tin, tellurium) and be applied in a number of ways such as electroplating, sputtering, thermal evaporation and deposition, chemical vapour deposition, lead and lead alloy shot blasting, plasma or thermal spraying or by direct application of thin metal foils in the pressing mould. It is an advantage of the invention that a wider variety of alloys can be considered than has previously been available to the lead-acid battery engineer, where the alloys must not only satisfy corrosion conditions, but also strength criteria and an ability to be fabricated into metallic grids. One convenient way of applying the interlayer in the laboratory is by electroplating as follows:

One side of the flanges were painted with a stopping-off lacquer such as Lacomit® from HS Walsh & Sons Ltd. The plate was then sealed with a rubber O-ring onto the bottom of a plastic plating tank with the stopped-off flange uppermost. A lead metal strip was pressed against the other side of the flange to provide an electrical connection. When plating the side which will be used as a positive, about 500 ml of a plating solution such as 27% lead/tin methane-sulphonic acid, containing a starter additive such as Circamac HS ST6703 (both materials are supplied by MacDermid Canning Ltd.) was poured into the plating tank. A large pure lead anode was used as the counter electrode. On the plates of the laboratory size, a current of 0.5 A is applied for 7 hours, which deposited approximately 10 g of an alloy whose composition is approximately 6:94 tin:lead.

Plating the negative side was similar except the plating solution is lead methane-sulphonic acid (Circamac HS ST6703). A current of 0.5 A was applied for approximately 3 hours which deposits about 5 g of lead metal.

Other plating solutions such as those based of fluoroboric acid can be used. The plating process can also involve the use inter alia of "dispersoids" such as titania, to produce a rougher surface finish for better keying with the paste subsequently applied.

Adjustments to the plating current and other additives can also advantageously affect the surface morphology of the layer.

After electroplating, the plates are removed from the plating bath and washed thoroughly in deionised water. The stopping-off lacquer is removed with acetone.

Another convenient way is by direct application of thin metallic foils in the pressing mould. For instance, a foil of lead with two percent tin alloy, 50 micron thick, is placed in the bottom of the preheated mould and the resin and the powder mixture spread thereon. A second foil is placed over the spread material before the mould is closed and the resin is cured as above. At this stage, the metallic layer, whether applied by electroplate, direct foil pressing, plasma or flame spraying. sputtering, chemical vapour deposition, or any other method can be activated by washing it in concentrated sulphuric acid immediately prior to pasting.

In another embodiment of the invention, a lead dioxide layer or a tin dioxide (suitably doped with for instance antimony to increase the conductivity) can be applied on to the substrate by methods such as anodic electroplating, sputtering, chemical vapour deposition and like processes, either directly or after the metallic layer is applied. Such a layer is preferably applied on the positive side of a bipolar electrode.

It is well understood in the lead-acid battery industry that a certain low level of corrosion of a lead or lead alloy electrode improves the adhesion of the active paste (particularly the positive paste) to the electrode. However, in the case of an interlayer of the present invention, if the corrosion rate is too high, the interlayer can be completely consumed, especially under deep discharge or high overcharge conditions of a lead-acid battery. One aspect of the invention is to provide an interlayer with different areas, some of which are highly corrodible (which give good paste adhesion) and other areas are more corrosion resistant (which gives long life).

The method described above produces plates which are nominally flat. However, plates with simple and compound curvature and different perimeter shapes can be made by appropriate modification of the shape of the mould. When assembled into batteries, such plates will engender an appropriate shape on the finished battery to enable it to be installed more conveniently in (for instance) a body panel of a vehicle.

EXAMPLE 2

Plate electrodes of the invention were tested before the application of any metallic layer or active battery paste to confirm the absence of any invisible micropores through the plate which would allow ionic species (such as $H^+$, $OH^-SO_4^{2-}$) to migrate through the plate. A suitable testing cell which simulates very closely the processes which occur in a battery is shown in the accompanying FIG. 1. The plate was assembled as if it is a bipole in a 4V cell which also contains a fully pasted, cured and charged positive monopole and a similar negative monopole. These are preferably of the conventional lead grid type. 30% sulphuric acid was placed between the plate and the monopoles in the conventional manner. A potentiostat was applied across the monopoles to hold the voltage across the test plate (measured by two identical reference electrodes in the acid either side of the test plate) to be 2.6V—which is chosen as the maximum that will be applied across a lead acid battery bipole in normal operation. The current flowing is noted.

We have found that a typical current observed initially to be about 0.3 A/m². This holds very constant over long periods (months) when the plate is manufactured as above with the preferred epoxy resin. With other resins, it is possible that although the current measured starts off low, it rises over a few days or weeks by several orders of magnitude. This implies that some resins are being corroded or otherwise degraded by the acid at high oxidation and reduction potentials and that ionic porosity is being created. Such a plate formulation is unsuitable for bipolar battery electrodes and means that by using the test outlined, the person skilled in the art will be able to determine which resins are best used in this invention.

The invention is not limited to the examples. The plate electrode may have a flange moulded of resin which is free of the suboxide powder. This will reduce the cost of the plate but still provide effective sealing. The invention is applicable to electrochemical cells in general, including bipolar lead acid batteries, to other types of batteries and to fuel cells, redox energy storage cells and the like.

This invention is not restricted to conductive particles such as the titanium suboxides although these are known to be very highly corrosion resistant, when manufactured according to the teachings of U.S. Pat. No. 5,173,215 which is required for lead-acid battery electrode applications. Other conductive particles can also be used such as niobium doped titanium oxides, tungsten oxides, niobium oxides, vanadium oxides, molybdenum oxides and other transition metal oxides in both stoichiometric and non stoichiometric forms. It is an advantage of the invention that good conductivity electrodes can be made from relatively low conductivity particulate materials, or by a smaller proportion of relatively expensive particulate materials.

The invention claimed is:

1. An electrode comprising a shaped body which is formed of hardened thermoset resin, the body having electrical paths defined by contacting conductive particles wherein i) the conductive particles are titanium suboxides of the formula $Ti_nO_{2n-1}$ where n is 4 or greater, ii) the particles have a size distribution with a standard deviation of less than about 50% of the mean particle size, iii) the body has a density of 1.8 g/cc or above, and iv) the electrode is sufficiently pore-free such that the electrode has a current leakage of less than 1 A/m².

2. An electrode according to claim 1, wherein the titanium suboxides are suboxides selected from the group consisting of $Ti_4O_7$, $Ti_5O_9$ and $Ti_6O_{11}$.

3. An electrode according to claim 1, wherein the particles have a mean particle size in a range of about 50 to about 300 micron.

4. An electrode according to claim 1, wherein there is a bimodal distribution of substantially uniform large particles and a proportion of smaller particles dimensioned to fit in interstices formed between the large particles.

5. An electrode according to claim 1, wherein there is a polymodal distribution of a range of particle sizes ranging from large particles to successively smaller particles dimensioned to fit in interstices formed between larger particles.

6. An electrode according to claim 1, including high aspect and/or low aspect particles of the titanium suboxide to increase connectivity.

7. An electrode according to claim 1, having an overall electrical conductivity greater than 0.5 S.cm$^{-1}$.

8. An electrode according to claim 7, having an orthogonal conductivity greater than 1. S.cm$^{-1}$.

9. An electrode according to claim 1, in the form of a plate which is flat or has curvature.

10. An electrode according to claim 1, which has a metallic layer applied to a surface thereof.

11. An electrode according to claim 10, where the metallic layer has areas of differing corrosion rates.

12. An electrode according to claim 1, having a lead dioxide or doped tin dioxide layer applied to a surface thereof.

13. An electrode according to claim 9, wherein the plate has a flange adapted to secure the electrode to a casing of a cell.

14. An electrode according to claim 13, wherein the electrode is sealed in a casing which is secured to the flange by adhesive or welding.

15. An electrode according to claim 13, wherein the flange is free of the particles of titanium suboxide.

16. An electrode according to claim 9, wherein the plate is received in a slot in a casing therefor.

17. An electrode according to claim 1, comprising a plate having a metal grid or mesh or sheet in the body thereof.

18. An electrode according to claim 1, comprising a plate having cooling channels in the body thereof.

19. An electrode according to claim 1, wherein a surface of the electrode has surface deformations for receiving and retaining active paste material.

20. An electrode according to claim 19, wherein the deformations are moulded in the surface.

21. An electrode according to claim 19, wherein the deformations are formed in the surface after the electrode has been moulded.

22. An electrode according to claim 19, wherein the deformations are dimensioned and shaped to receive different thicknesses of paste in different areas.

23. A method of making an electrode according to claim 1, the method comprising:
    mixing the conductive particles, an unhardened thermosettable resin and a hardener therefor to form a mix,
    pouring the mix into a mould therefor and
    moulding the mix to form a shaped body and thereby provide the electrode.

24. A method according to claim 23, wherein the mix includes a bimodal distribution of substantially uniform large particles and a proportion of smaller particles dimensioned to fit in interstices formed between the large particles.

25. A method according to claim 23, wherein the mix includes a polymodal distribution of a range of particle sizes ranging from large particles to successively smaller particles dimensioned to fit in interstices formed between larger particles.

26. A method according to claim 23, wherein the titanium suboxide comprises $Ti_4O_7$ and/or $Ti_5O_9$.

27. A method according to claim 23, wherein the particles of the titanium suboxide are first contacted with a gas for a period to extend the conductivity thereof.

28. A method according to claim 27, wherein the gas is helium or hydrogen.

29. A method according to claim 23, wherein the resin has a viscosity of less than about 50 Pa.s at 25° C.

30. A method according to claim 23, wherein the resin, hardener and particles are first formed into sheet moulding compound which is added to the mould.

31. A method according to claim 30, including the step of applying foils of metal to one or both surfaces of the sheet moulding compound.

32. A method according to claim 23, including the step of removing the shaped body from the mould and cleaning its surfaces.

33. A method according to claim 32, wherein the method of cleaning includes grit blasting.

34. A method according to claim 23, wherein excess resin is ejected from the mould during pressing.

35. A method according to claim 23, including the step of applying a thin layer of metal to the electrode before a paste is applied.

36. A method according to claim 23, including the step of pressing a metal foil on to a surface of the electrode whilst in the moulding press while the resin is curing.

37. A method according to claim 36, wherein the metal foil is up to 200 micron thick.

38. A method according to claim 35, including applying the metal layer by electroplating using a plating solution and optionally adding dispersoids to the plating solution.

39. A method according to claim 35, including treating a surface of the metal layer with a corona discharge or plasma.

40. A method according to claim 35, including adding a coupling and/or wetting agent to the paste.

41. A battery including an electrode according to claim 1.

42. A battery according to claim 41, comprising a plurality of electrodes and an acid electrolyte.

43. An electrode according to claim 1 wherein the hardened thermoset resin comprises an epoxy.

44. An electrode according to claim 1 having a conductivity in the range of 1 to 2 $Scm^{-1}$.

45. An electrode according to claim 1, wherein the conductive particles comprise particles of $Ti_4O_7$, $Ti_5O_9$ and $Ti_6O_{11}$.

46. A substantially pore-free electrode comprising a shaped body which is formed of hardened thermoset resin, the body having electrical paths defined by contacting conductive particles, wherein i) the conductive particles comprise suboxide particles of $Ti_4O_7$, $Ti_5O_9$ and $Ti_6O_{11}$, ii) the particles have a size distribution with a standard deviation of less than about 50% of a mean particle size, and iii) the body has a density of 1.8 g/cc or above.

47. An electrode according to claim 46, wherein the suboxide particles consist essentially of $Ti_4O_7$, $Ti_5O_9$ and $Ti_6O_{11}$.

48. A bipolar lead acid battery comprising a plate electrode comprising a shaped body which is formed of hardened thermoset resin, the body having electrical paths defined by contacting conductive particles, wherein i) the conductive particles comprise suboxide particles of $Ti_4O_7$, $Ti_5O_9$ and $Ti_6O_{11}$, ii) the particles have a size distribution with a standard deviation of less than about 50% of a mean particle size, iii) the body has a density of 1.8 g/cc or above, and iv) the electrode is sufficiently pore-free such that the electrode has a current leakage of less than 1 $A/m^2$.

* * * * *